July 10, 1956
G. THIMAN
2,754,157
RESILIENT ELEMENTS
Filed Oct. 30, 1953
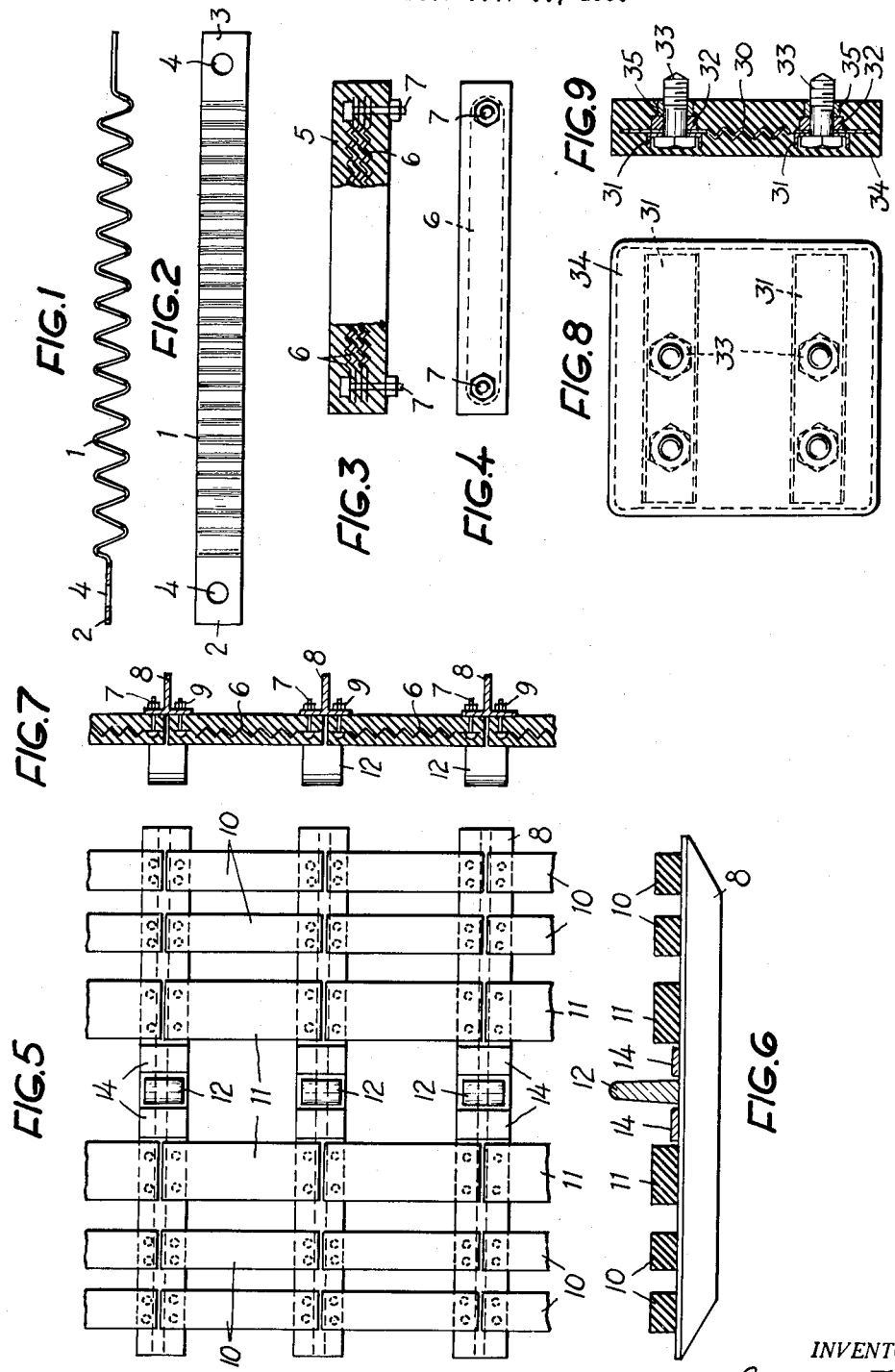
INVENTOR.
GUNNAR THIMAN
BY Young, Emery & Thompson
ATTYS

United States Patent Office 2,754,157
Patented July 10, 1956

2,754,157
RESILIENT ELEMENTS

Gunnar Thiman, Stockholm, Sweden, assignor to Ingeniorsfirman Invent Aktiebolag, a corporation of Sweden Application October 30, 1953, Serial No. 389,439

Claims priority, application Sweden November 1, 1952

3 Claims. (Cl. 305—10)

The present invention refers to a resilient element that is capable of being used for a great number of different purposes and particularly as reenforcement in an elastic material, and also as a drawspring and connecting member between rigid parts for which a certain mutual mobility is desired.

According to the invention, the resilient element is distinguished, above all, by the fact that it consists of a corrugated flat-spring. This formation increases the flexibility and serviceableness of a flat-spring for various purposes to a considerable extent. Thus it is not only resilient when subjected to flexure as an ordinary flat-spring but also when subjected to drawing so as to be capable of being used as a drawspring. When used as reenforcement in an elastic material subjected to flexure as well as to drawing the element has outstanding advantages.

The invention also comprises applications wherein the resilient element is made use of, particularly in tractor belts constructed in a special manner and intended in the ordinary way to form a support for the carrying wheels of a tractor.

A few examples of the application of the invention are illustrated in the accompanying drawings. Figs. 1 and 2 show a resilient element according to the invention viewed in elevation and in a plan view, respectively. Figs. 3 and 4 show similar resilient elements when used as a reinforcement in an elastic material and viewed in longitudinal section and in a plan view at right angles thereto, respectively. Figs. 5, 6 and 7 show the invention as applied to a tractor belt, a portion of which is shown in a plan view in Fig. 5, as a corresponding cross section in Fig. 6, and in longitudinal section in Fig. 7. Figs. 8 and 9 show a plan view and a corresponding section of a reinforced block for a tractor belt.

The resilient element shown in Figs. 1 and 2 consists of a flat-spring or a resilient band of steel, for example, the intermediate or main portion 1 of which is corrugated. In the construction shown, the element is also provided with straight end portions 2, 3 serving as attachments to secure the element to other members, if desired. These end portions or attachments may be provided with apertures 4 for bolts or other connecting members. The element is preferably of a rectangular or substantially rectangular cross section.

Particularly in such combinations where the resilient element is subjected to wear, it will be found advantageous to surround it with some lasting elastic covering, preferably by moulding the same into a suitable material, such as rubber. Relevant examples are shown in Figs. 3 and 4. Here, a plurality of corrugated leaf springs 6 are moulded into the rubber body 5 made in the form of a strip or a band, together with which the springs form a resilient element according to the invention. The leaf springs have corrugations fitting one another and plane end portions having bolts 7 or other attaching members extending therethrough and serving for the attachment of the resilient element to members intended to be resiliently connected to each other. In order to impart the requisite flexibility to the element, the resilient elements should be relatively thin, and the requirements as to tensile strength are then answered by an increase of the number of combined springs. These springs may be manufactured from plane bands, a number of which are corrugated simultaneously when laid on top of each other in packs, such as four bands in every pack.

Resilient elements of the construction shown in Figs. 3 and 4 are particularly well adapted as connecting elements in tractor belts and similar band webs, for instance of the constructions shown in Figs. 5–7. In the construction according to these figures there are six rows of resilient elements, which are rigidly secured to transversely extending strips, here in the form of angle-irons or T-irons 8. The securing is effected by means of the bolts 7, here two of them at each end of the element, that project from the resilient element and extend through apertures in the flanges of the T-irons, as well as by means of nuts 9. The resilient elements 10 of the two outermost rows on each side are narrower than the resilient elements 11 next to the middle of the band. The flat-springs adapted as an armouring are denoted by 6.

The T-irons are provided with nabs 12 at the center thereof, said nabs being adapted to engage guide grooves in the tractor wheels. Wear protectors 14 may be provided laterally of every guide nab, said protectors being caused to bear on the periphery of the wheel, when the band passes over the tractor wheels.

The tractor bands should be flexible to such an extent as to be able to pass over the driving and guide rollers of the tractor. Thus they must be able, for instance, to pass over a roller of a diameter of 300 mm., for example, the resilient connecting elements being caused to bend thereat. To this end the flat springs should be relatively thin, for instance of a thickness of 0.3–0.5 mm. The requisite tensile strength will be obtained in the manner set forth above by laying two or more corrugated springs together.

Resilient elements for caterpillar bands of tanks and similar vehicles may take the form of substantially rectangular plates or blocks as shown in Figs. 8 and 9. It is important that the corrugated springs are extended in a plane, and with this in view the spring 30 is clamped between a U-strip 31 and a flat metal strip 32 by bolts 33 having their heads between the shanks or flanges of the U-strip 31 and their screw-threaded ends projecting from the surrounding resilient block 34 to be carried through and secured to transverse elements such as the T-bars 8 shown in Figs. 5–7. Washer members 35 are mounted on the bolts, said washer members having their one end surface in flush with the surface of the block adapted to engage the T-bars. The corrugated spring plate, the U-strips 31, strips 32 and the washer members 35 are embedded in the block, which may be of rubber or similar material.

Corrugated flat-spring bands of greater lengths may be used as conductors suspended as air-lines for the transmission of electrical energy. Since they are resilient in themselves with great facilities for an elastic extension and shortening, expansion means may be omitted to a greater or smaller extent in connection therewith.

The resilient element according to the invention may be used as a substitute for links in flexible bands or chains for various purposes and then have the special advantage of being able to impart an initial tension to the band owing to their own resiliency. They may be connected between rigid links of various kinds, for instance also between such grate-like plates that are contained as members in known snow tractor belts.

The embodiments shown are only to be regarded as examples to which the invention is by no means restricted.

What I claim is:

1. A resilient element for connection of transverse members in a tractor belt, comprising a block of rubber or similar elastic material, an undulate reinforcement spring with bolt holes, connecting bolts extending through said bolt holes with their ends projecting from the block, pairs of clamping strips engaging the spring at opposite sides thereof, said bolts also extending through said clamping strips, and washer members on the bolts, the spring, clamping strips and parts of the bolts being embedded in the elastic material of the block.

2. A resilient element as claimed in claim 1 and having one strip of each pair of clamping strips formed with a U-shaped cross section, the heads of said bolts being located between the shanks of said U.

3. A resilient element for connecting transversely extending plates in tractor belts comprising a corrugated leaf spring with the tops of the corrugations extending transversely of the spring and formed for attachment at each end, and a body of elastic material, the leaf spring being embedded in said body, said element being provided with attachments to be rigidly secured to the plates in a manner such that the resiliency is obtained by flexure of the element.

References Cited in the file of this patent

UNITED STATES PATENTS

| | | |
|---|---|---|
| 263,566 | Nixon | Aug. 29, 1882 |
| 1,370,379 | Straub | Mar. 1, 1921 |
| 1,438,859 | Rimailho | Dec. 12, 1922 |
| 1,507,458 | Dreyer | Sept. 2, 1924 |
| 2,219,221 | Carchidi | Oct. 22, 1940 |
| 2,332,313 | Galanot | Oct. 19, 1943 |
| 2,371,071 | Schonitzer | Mar. 6, 1945 |

FOREIGN PATENTS

| | | |
|---|---|---|
| 678,460 | Germany | July 15, 1939 |